United States Patent [19]

House et al.

[11] 4,428,842

[45] Jan. 31, 1984

[54] WELL RESERVE PIT LIQUOR TREATMENT PROCESS

[76] Inventors: Sherre D. House; Gary E. House, both of Rte. 2 Grass Valley Acres #13, Woodward, Okla. 73801

[21] Appl. No.: 293,698

[22] Filed: Aug. 17, 1981

[51] Int. Cl.³ .............................................. B01D 17/02
[52] U.S. Cl. .................................... 210/747; 210/750; 210/805; 210/901
[58] Field of Search .............. 210/208, 729, 747, 750, 210/770, 800, 804, 805, 901, 76 S

[56] References Cited

U.S. PATENT DOCUMENTS

| | | | |
|---|---|---|---|
| 3,108,059 | 10/1963 | Greenwald | 210/708 X |
| 4,179,369 | 12/1979 | Bradley et al. | 210/708 |
| 4,350,596 | 9/1982 | Kennedy | 210/708 |
| 4,366,063 | 12/1982 | O'Connor | 210/747 X |

Primary Examiner—Thomas G. Wyse
Attorney, Agent, or Firm—Ely Silverman

[57] ABSTRACT

A system and process for treating oil well discharge pit liquors mixes successive portions of the watery layer of such liquors with surface active agents and sprays the resultant mixture in the air so that a large portion thereof is rapidly evaporated and the non-evaporated portion is applied to one or more of the walls of the pit as a spray. The watery spray particles so applied reversibly enter the interparticulate spaces in the pit walls without disturbing the capillary characteristics thereof and are subsequently evaporated. The penetration of such liquor from the spray into the pit wall is monitored to control (a) the amount of surface active agent added to the liquor, (b) the amount and rate of the spray of the liquid to the walls and (c) avoid contamination of water-bearing earth strata below the pit walls.

9 Claims, 4 Drawing Figures

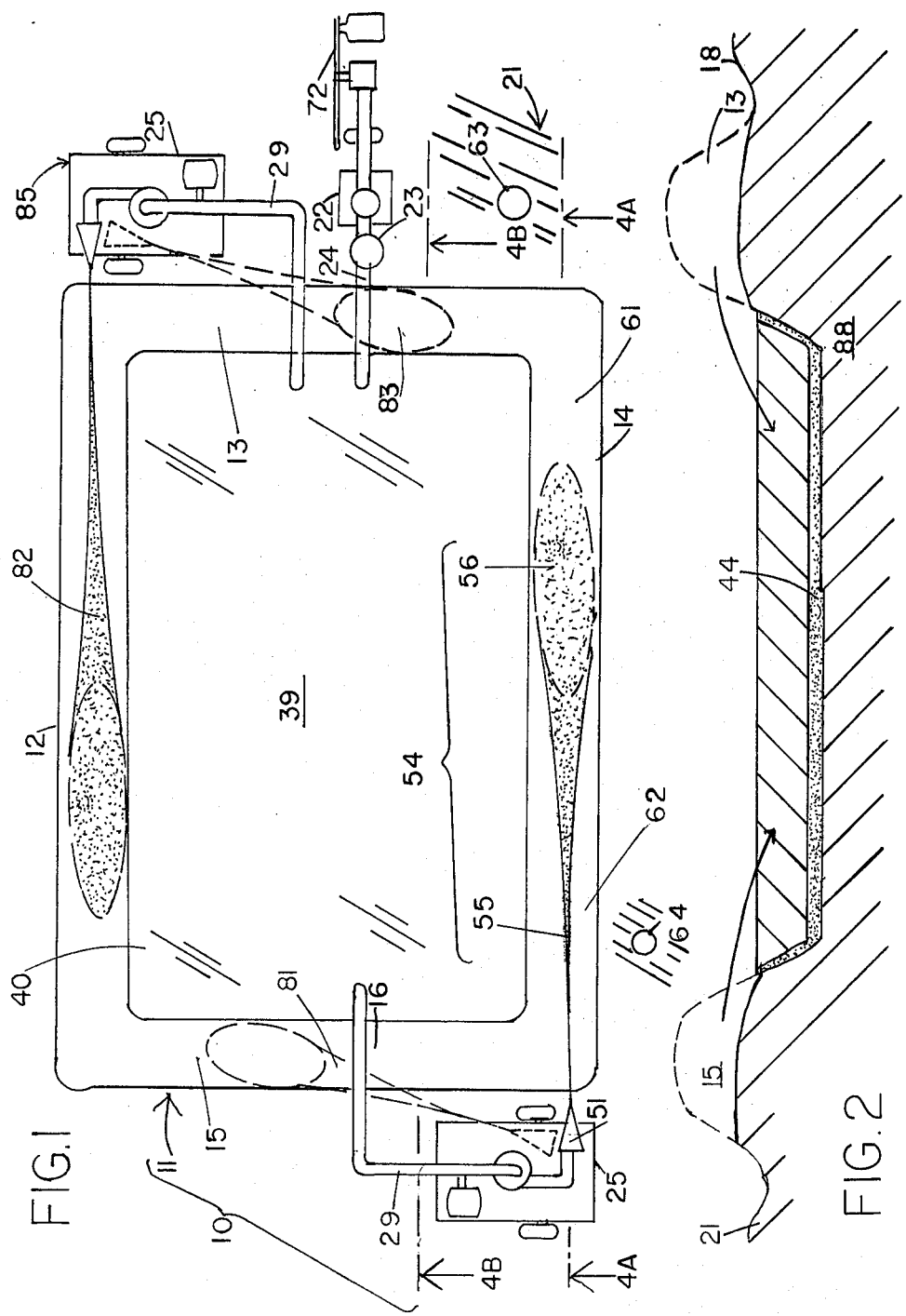

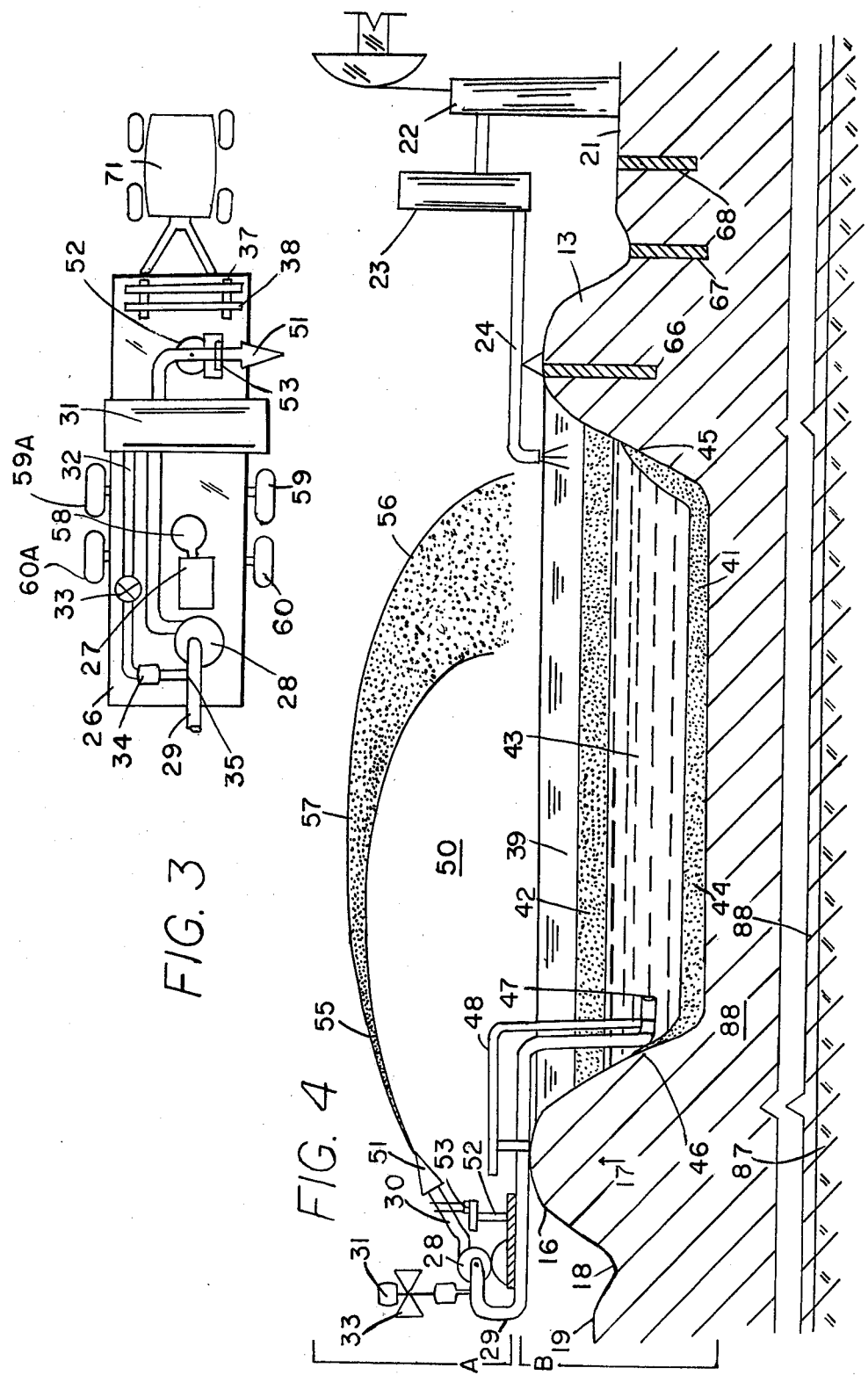

WELL RESERVE PIT LIQUOR TREATMENT PROCESS

BACKGROUND OF THE INVENTION

1. The field of the invention is oil well related process and treatment outside of such wells of materials leaving such wells.

2. Description of the Prior Art:

Prior treatment of discharge liquors from wells has been to hold such liquors in pits until evaporated or to transport such liquors to areas deemed satisfactory for disposal. This has resulted in undesirable pollution in areas to which such liquors are transported as well as in those areas in which such liquors are stored. While governmental regulations provide for lining of well discharge liquor storage pits to prevent ground water pollution pending evaporation of such liquors, such materials are frequently so mishandled that those liquors damage the areas neighboring such storage pits as well as ground water below such storage zones.

SUMMARY OF THE INVENTION

A system and process for disposing of water-containing well discharge liquors comprises a system for and the steps of passing the well discharge liquor into a pit open at its top to the atmosphere, separating said liquor into a lower watery phase and upper oily phase, withdrawing a portion of said water phase from said pit below the level of said upper oily phase, adding a biodegradable surface active agent to successive portions of said water-phase liquor and forming a resultant mixture of reduced surface tension, pumping the resultant mixture to an elevated pressure and forming a stream therefrom and forming such stream into a first homogeneous and narrow spray portion and a second spray stream portion which is formed of separate discrete droplets, said spray stream being located above the top of one of the walls of said pit, evaporating a substantial portion of said liquor into the atmosphere and applying the remaining portion of said stream to a top portion of one of said walls as a spray, distributing the droplets of said spray stream on the pit walls and into interparticle spaces along the length of said pit walls and downward from the top of said walls into pores in said pit walls without changing the capillary characteristics of the wall, and evaporating water from the upper surface of the pit walls and concurrently moving the earlier gathered water upwards from the interior pores or interstices of said pit walls to the upper exterior surfaces thereof, discontinuing the application of said stream portions to said pit walls and then applying a stream of said liquor to the top of another of the pit walls, measuring the location of the water from said liquor streams and the depth of penetration of said waters in the pit walls at a plurality of points on the surface of said walls and at a plurality of depths in said walls during the period of said application of said liquor to said pit walls, and controlling the surface active agent content of said streams and amount of application of stream liquors to said walls to limit the depths of penetration of said liquors through said walls and thereby avoiding contamination of the water below said wall of said pits.

The system comprises a movable assembly for applying surface active chemical reagents to successive portions of watery liquors drawn from a well reserve pit and a rotatable nozzle for applying streams of the mixture resultant from admixture of such reagents to the atmosphere and to the pit walls as a spray. The chemical control of the mixture provides for avoidance of excessive penetration of the pit walls or the earth layer between such oil well discharge liquor pit and water-bearing strata therebelow.

In the overall, the pit walls—which contain about the same volume as does the liquor in the pit—are used as a sponge rather than as a seive in order to provide temporary storage of the watery, liquors not evaporated in the spray stage between the stages of their withdrawal from the pit and later evaporation, which provides for rapid disposal of such liquors, while the control of the amount and composition of the liquor applied to the walls, which control is effected by monitoring of the water content of the pit walls, avoid contamination of neighboring water storage zones. The addition of surfactant in limited amounts selectively to the liquor applied as a stream to the atmosphere (as well as the pit walls) also provides for effective exposure of such liquors to the atmosphere for rapid disposal of such liquor by evaporation.

DESCRIPTION OF DRAWINGS

FIG. 1 is a plan view showing in diagrammatic form the operation of a process and system according to this invention. FIG. 1 shows two alternative positions (one at 25, one at position 85) of the sprays from each of two alternative positions of the pumping and mixing and spraying assembly 25. One of each of such alternative positions (i.e. 81 and 83) is shown in dashed lines.

FIG. 2 is a diagramatic section taken along the plane 2A—2A of FIG. 1 to illustrate the method of closing up the operation after the completion of the use of the pit shown in FIGS. 1 and 4.

FIG. 3 is a diagramatic plan view of the pump and mixing assembly trailer 25 shown in FIGS. 1 and 4.

FIG. 4 is a diagramatic composite vertical longitudinal section taken in part along zone 4A—4A of FIG. 1 in the part indicated by bracket A of FIG. 4 and along section 4B—4B of FIG. 1 in the part indicated by bracket B of FIG. 4.

DESCRIPTION OF THE PREFERRED EMBODIMENT

The system 10 according to this invention comprises an oil well discharge pit 11, located in a field 21 adjacent to an oil well 22 and comprises a pumping and mixing trailer assembly 25.

The oil well discharge pit 11 comprises a plurality of connected vertically extending walls as a north wall 12, east wall 13, south wall 14, and west wall 15 which surround an oil pit cavity 40. Each of the walls 12–15, as shown for the wall 15 comprises a top surface portion 16, and a base 17. Laterally of the walls is a moat 18 having a bottom at a lower level than the level 19 of the adjacent field 21.

The conventional oil well 22 has a separator 23 and a discharge line therefrom 24 which extends into the pit cavity 40.

The pump and mixing assembly trailer 25 comprises a mobile trailer frame 26 on which are firmly supported an engine 27 and a pump 28, a fuel tank 58, a nozzle support 52, a movable nozzle 51, a reagent container 31 and associated piping as well as a testing implement rack 37.

The mobile trailer frame 26 is a rigid steel frame movably supported on conventional tired wheels such as 59 and 60 and 59A and 60A. The engine 27 is firmly attached onto the frame and is operatively connected to drive a conventional liquid pump 28. A pump inlet line 29 extends to the inlet of the pump 28 from the cavity 40 and a pump outlet line 30 extends from the discharge of pump 28 to a nozzle 51. Nozzle 51 is adjustably located on a nozzle support 52 and is also provided with a nozzle guide 53. A reagent container 31 is also firmly attached to the frame 26 and has an outlet line 32 with a control valve 33 and connects with a reagent flowmeter 34. The discharge of the reagent flowmeter is connected by a tee 36 to the inlet 29 of the pump 28. A rack 37 is carried by the frame 25 or may be carried in a truck as 71 which draws the frame. A plurality of testing implement such as pipes or tubes 38 are carried on rack 37.

A pit cavity 40 has a base 41 and the liquor discharged through line 24 forms an upper oily phase or layer 42 and the lower aqueous phase or layer 43. A water-tight bottom lining 44 is formed at the base of the cavity by a plastic sheet or by clay provided by drilling mud clay in the liquor from line 24 or is separately provided to form a layer 44 at the base of the cavity and also to form a water-tight lining as 45 and 46 at the sides of the cavity. The pump inlet line 29 has an opening 47 which is located by a rigid guide 48 to be open to the layer of liquid formed in the lower phase 43 of the body of liquid in cavity 40. The upper surface 39 of the body of liquor is open to the atmosphere 50.

In operation of the system 10, the well 22 discharges a liquor containing a water phase into an oil-liquid separator 23 in which oil and gas and water phase discharge are separated and from which a separator discharge line 24 discharges the well liquor discharge into the pit cavity 40 of pit 11. The pit cavity 40 retains that liquor within the receptacle formed by the vertically and horizontally extending pit walls 12–15 and the pit base 41 of pit 11. The pit walls are composed of earthy particles formed by moving the surface soil and sub surface soil, usually referred to as horizons A and B, to form walls as 12–15 and also to form a peripheral moat as 18. The tops of each of the pit walls as top 16 of the pit wall 15 extends above the height or level of the field 21 peripheral to the pit and the pit bottom 41 extends downward to a level below the level of the ground or field 21 neighboring the pit 11. Once in the pit cavity 40 the well discharge liquor separates into a lower aqueous layer or phase 43 comprising principally water and an upper layer or phase 42 which is oily. The mobile trailer assembly 25 is brought into position by a truck as 71 so that the support 52 for rotatable nozzle 51 is located on a straight line extending along the length of the center line of the top of a pit wall as 14, as digrammatically shown in FIG. 1. Alternatively, the apparatus on trailer assembly 25 may be attached to the frame of a truck assembly. The inlet line 29 to the pump 28 serves in operation of the pump by the engine 27 for withdrawing water from the pit cavity 40. Such liquor is withdrawn from the phase or layer 43 i.e. the watery portion below the level of the oily phase 42 thereabove. A surface active agent which is biodegradable is added to the liquor passing from the phase 43 of the body of liquor in pit or receptacle 40 to the inlet line 29 of the pump. In the preferred embodiment, this agent is an alkyl aryl polyalkoxylated alcohol (23.6% by weight with 76 percent water) having a pH of 9.2 and a weight of 8.4 pounds per gallon and an HLB value [as described at page 189 and at table 6-2, page 190 of Becher, P., Emulsions: Theory and Practice, American Chemical Society Monograph 135, Reinhold Publishing Corp. N.Y. 1957] in excess of 13.

Other dispersants or emulsifiers which may be used as agent added to line 29 are nonionic hence independent of water hardness and pH. Such other nonionic emulsifiers include the alkyl aryl polyether alchols sold as AGRIMUL ® 70-A, 70-C and 70-GM by Nopco chemical company of Harrison N.J. and the Polyethylene glycol ethers of hydroabietyl alcohol sold by Herculese Powder Co. of Wilmington Del. known as SYNTHETICS ® AD50, AD160, and AD 400.

All these are non-ionic biodegradeable emulsifiers; the amount used thereof may be controlled to produce the same effects above described of reducing the surface tension of liquor in a stream as 54 to a desired degree as above described and for dispersing the oil in the portion of the water of phase 43 which portion passes along line or pipe 29 to pump 28 while at the same time the extent of activity of such agents is controlled by controlling the amount thereof introduced into line 29 dependent upon the soil conditions of the pit wall and volume of liquid applied to the pit walls. The soil conditions are determined by the soil particle size compositions of the pit wall and its water absorbency and by the testing of penetration of the liquid to insure that no such penetration of that (the liquor applied thereto as stream 54 from phase or layer 43) is developed as might be undesirable because of its penetration into the earth to a depth beyond about 10 ft., while at the same time a sufficient amount of such agent is used to provide for (a) adequate penetration of the liquor sprayed (as in the stream 54) over and onto the pit wall and (b) evaporation into the atmosphere; such adequate penetration utilizes the pit wall for its sponge-like action to provide for absorption and later evaporation of the liquid without harm to the subsoil water strata.

The amount of emulsifier or dispersant is also adequate to provide for such a rapid disruption of the jet-like stream 54 as to provide for a substantial amount of evaporation of such stream in the atmosphere above the pit and so rapidily disperse and dispose of such waters.

This addition is automatically made by passing the reagent from a reagent container 31 by its discharge or outlet line 32 through a control valve 33 and through a reagent measuring device 34 to a tee 35. The reagent measuring device is a conventional flow meter. The relative amount of surface active agent added to liquor in line 29 is important and is regulated so that the effect thereof will be as below described. For this purpose the amount of surface active agent is carefully metered. This metering is accomplished by adjustment of the control valve 33 and monitoring the resultant flow rate, as by observing the flow meter. In the preferred embodiment the surfactant or surface active agent in tank 31 is added at a uniform rate of one gallon of surface active agent for each 1500 gallons of liquid that is passed through the pump 28 from layer 43. The amount of surface active agent added is sufficient to lower the surface tension of the liquor to 30 dynes per centimeter.

Following this admixture of surfactant with the liquid from layer or phase 43 the resultant mixture is brought to an elevated pressure of between 100 pounds per square inch and 250 p.s.i. and pumped through a 2 inch inside diameter nozzle 51 at the rate of 850 gallons per minute. Generally this operation handles about 1800 barrels (each barrel containing 42 gallons) in fourteen hours.

The nozzle 51 provides for distributing the liquor in a narrow stream 54 which extends in a parabolic path. This path extends generally parallel to and above one of the walls as 14 as shown in FIG. 1. This stream is homogeneous in the portion thereof adjacent to the discharge nozzle 51 but such stream disrupts after travel to its maximum height (usually a maximum of about 60 feet) and then breaks up into a spray formed of separate discrete droplets. Such distant portions of the discharge stream, as 56, is applied to the top of the wall 14 and is then in the form of droplets of about the density of a heavy rain.

The resulting spray of droplets from the portion 56 of the stream 54 is applied to the top of the pit wall. The length of the parabolic path 54 is determined by the pressure developed by the pump 28. This pressure is controllably varied by varying the speed of the internal combustion engine 27. The speed of the engine 27 is adjusted by adjustment of its throttle. Thereby the position of the area of impingement of the distant portion of the stream as 54 on the top of the wall of the pit (as top wall 12, 13, 14, or 15) may be varied as needed so as to apply liquor from layer 43 to all parts of the tops of the pit walls in a relatively even amount and rate manner, so that water is applied to the top of such wall (14) at a substantially uniform stream density and so that equal amounts of water are applied to each of the increments of area of that pit wall top surface. The direction of the path of stream 54 may be varied by rotation of the nozzle 51 about its support 52 to provide that the jet stream is located above the wall 15, as shown by the position of stream 81, and similarly, as described for the stream 54 and wall 14, applied to the wall 15 at a rate that is substantially uniform with respect to stream density and amount of water applied to increments of the top surface of such wall.

Also the mobile assembly 25 maybe moved as by truck 71 to the position 85 with the nozzle support 52 located in line with length of wall 12 and nozzle 51 oriented to apply a stream 82, like stream 54, to the wall 12 of by a stream 83 to the wall 13 in the same manner as herein described for stream 54 and walls 15 and 14.

Because of the concentration of surface active agent added thereto, the liquor spray as 56 applied to each pit wall as 14 flows down in the interstices or interparticulate spaces between the particles forming the mass of such pit walls. Such particles range from sand size (0.05 mm diameter to 2.0 mm) and silt size (0.002 to 0.005 mm) with very minor amount of particles of clay (particles have less than 0.002 mm diameter size) and are generally known as loam (40–50% silt, 40–50% sand, 0–10% clay). The concentration of surface active agent is such that the surface tension of the liquor is so reduced that the small clay-like particles found in the pit walls are not displaced by the downward flow of such liquid; to the contrary, the liquor flows through the interparticulate spaces without pushing the fine particles before it and thereby displacing them from their normal space or location between the larger earth particles. Accordingly the application of the liquor in spray form to the pit walls does not disturb the particle distribution in the mass of the earth forming the pit walls. Also, the surfactant concentration is adequate to prevent the oily components in the liquor from layer 43 from blocking passage of the liquor into and out of the interparticulate spaces of the pit wall but is so limited in amount that it does not provide action on the water normally held in the earth to undesirably increase its penetrability below the pit walls.

During the period within which the stream 54 is formed with concurrent disruption of the stream into droplets at the portion 56 thereof there is substantial evaporation of water from that stream into the atmosphere, 50, above the body of liquor in cavity 40. This evaporation occurs at the maxium height of the top of the parabolic form of the stream, such as its apex 57, and particularly at the distant portion 56 of the stream that has been disrupted and formed into droplets. Generally, on a dry day (relative humidity of 10–30%), about 30% of the liquor that leaves the nozzle 51 is evaporated before the distant portion 56 of the stream reaches the top of the pit wall: this evaporation is dramatically demonstrated by the formation of a rainbow which persists over the area of the pit from 10 to 20 minutes after cessation of the spraying operation.

Following the application of the particulate droplet portion 56 of the stream 54 to the pit wall as 14 there is evaporation of the water from the upper surface of that wall and, concurrently, a movement upward of the water from the interparticulate spaces or interstices of the mass of earth forming the interior of the wall mass as to the upper exterior surface thereof and there is accordingly an evaporation of the water therefrom into the atmosphere.

During the overall period of application of each stream as 54, 81, 82, and/or 83 to walls 14, 15, 12, and 13, respectively, measurements are made of the penetration of the water from such stream into the pit wall at a plurality of points on the wall, such as, for wall 14 at points 61 and 62 as well as at a position as 66 below wall 13, point 67 below the moat 18, and in the field 68. Such measurements are taken by driving a 6 to 8 feet long hollow one inch diameter steel pipe as 38 into the ground to form a sample core, which core is located and held in the pipe, then lifting the pipe up out of the ground and then putting a piston or a solid rod having about the diameter of that core into the hollow pipe and displacing the sample core. Thereby a sampling of the earth is achieved during the period of the spraying operation for which purpose the spraying operation is interrupted while such core samples are being taken. Such measurement provides for an effective monitoring of the penetration of said wall and earth by the components of the streams as 54 during the overall period of their operation.

In a typical installation of such system as 10 as at Custer County, Okla., the walls 12–15 are each 175 to 200 feet long, and extend 20 feet above the level of the ground and the base as 17 is 40 feet wide and the pit cavity 40 extends 4 feet below the level of the field 21. The sample positions 63 and 64 are 20 feet lateral from the peripheral portion of the adjacent wall. On operating the pump 28 of assembly 25 at 850 gallons per minute, the height of the liquor surface 39 in cavity 40 is lowered by 2 feet in 12 hours. Samples taken from the middle of a pit wall as 14 showed only 10% moisture at 2, 4, and 6 feet depth. When such samples were taken, such samples were placed in styrofoam ® cup and heated in a microwave oven for 3 to 4 minutes to evaporate the water therefrom and so determine the water content of such samples.

In the preferred embodiment above described, which is a typical operation, the water of the streams as 81 does not penetrate to more than 8 feet depth from the upper ground surface as 16 to which such stream is applied. An increase in water content of the core can be readily seen by the naked eye; the dark color of the core shows where it is wet due to moisture from a stream as 54 and the absence of such coloring shows where water from streams as 54 has not reached. This monitoring accordingly provides for controlling the concentration of surfactant and application of the liquor drawn from the layer 43 and applied to the pit walls and readily provides for limiting the concentration of surface active agent and depth of penetration of such liquor downward through the pit wall. As the pit walls are considerably higher than 8 feet there is provided a complete avoidance of contamination of water-bearing strata, as 87, below the base strata 88 on which are located the pit walls and pit cavity and moat.

Inasmuch as the concentration of surface active agent is kept low and applied only to the portion of liquor drawn from the body of liquor in layer 43 there is no disruption of the water-impervious clay sealing layer 44 at the bottom or of layer 45 and 46 at the sides of the pit; accordingly there is no penetration of the liquor and the materials carried therein to the water bearing strata as 87 below the sub-surface soil strata 88.

After the pit has been emptied of water or substantially so, the mass of earth in the pit walls is moved back, as by bulldozers, into the cavity 40 of the pit as shown in FIG. 2. Inasmuch as the water absorption capacity of the earth is about 10% by weight and the pit walls have been acting as a sponge to return the water added thereto to the atmosphere and such pit walls are water absorbent they absorb the water of any slurry left in the pit. Such water, therefore, is dispersed in the mass of earth therefore located in the pit walls and the small amount of surface active agent theretofore provided to the water added to the pit walls is so small that the agent and water do not pierce the lining layers as 44, 45 and 46. Thus all contaminants in the well liquor including the surface active agent which are not evaporated are maintained in the pit and sealed off from passage to the sub-soil portions by the clay-like bottom liner 44 and side liners 45 and 46.

Frame 26 is a rigid rectangular steel frame with an imperforate deck. It is movably supported on wheels as 59, 60, 59A and 60A with tires adapted for moving on highway and on field. It is 18 feet long and 7 feet wide. A rigid steel support 52 is firmly fixed to the frame 26 and the nozzle 51 is an irrigation type nozzle rotatably supported on the support 52 for varied angle relative to the length of the frame and is held in place by a guide frame 53 firmly attached to the support 52 and the nozzle 51 for adjustably yet firmly holding the nozzle in position relative to the support 52. The angle relative to the horizontal is varied by tilting the trailer by a tongue jack between the trailer and the truck 71.

The HLB value of the above alkyl aryl polyoxylated alchol is 14.7 as determined by formula [set out at page 189 of Becher American Chemical Society Monograph 135] HLB=20 (1-S/A) where S is the saponification number of that ester and A is its acid number.

We claim:

1. A process of dispensing water containing well liquor discharge comprising the steps of
    (a) passing said well discharge liquor into a receptacle open at its top to the atmosphere, said receptacle containing said liquor between vertically and horizontally extending porous pit walls, said pit walls composed of earth particles, the particle distribution thereof being substantially the same at the top and the bottom of said walls, said walls extending above the ground adjacent thereto and said pit bottom extending below the level of said ground,
    (b) separating said liquor into a lower water phase comprising principally water and a upper oily phase,
    (c) withdrawing said water phase from said receptacle from a level in said liquor below the level of said upper oily phase,
    (d) adding a biodegradable surface active agent to said liquor to reduce the surface tension thereof and forming an resultant mixture,
    (e) pumping the resultant mixture to an elevated pressure and forming a stream therefrom and passing said stream through a nozzle and forming such stream into a first portion adjacent to said nozzle which is homogeneous and narrow and a second portion distant from said nozzle which is formed of separate discrete droplets, said stream being located above the top of one of said walls and
    (f) evaporating a substantial portion of said liquor passed from said nozzle into said atmosphere and
    (g) applying the remaining portion of said stream to a top portion of one of said walls,
    (h) distributing the droplets of said stream on said wall and into interparticle spaces along the length of one of said pit wall and passing liquor in said droplets downward from the top of said wall into said pit wall without changing the particle size distribution of the particles in the top portion of said wall,
    (i) discontinuing said application of said stream portion to said one of said walls and then applying a stream of said liquor to the top of another of said pit walls.

2. A process as in claim 1 and including the step of evaporating water from the upper surface of said first pit wall and concurrently moving the water upwards from the interior of said pit wall mass to an upper exterior surface thereof.

3. A process as in claim 1 including the step of controling the application of said stream liquor to said wall to limit the depths of penetration therethrough and thereby avoiding contamination of the water below said wall of said receptacle.

4. A process as in claim 3 including the step of measuring the location of the water and the depth of penetration of said water in said wall at a plurality of points on the surface of said wall and at a plurality of depths in said wall during the period of said application of said liquor to said pit wall.

5. Process as in claim 1 wherein said surface active agent reduces the surface tension of said liquor to 30 dynes per centimeter.

6. Process as in claim 5 wherein said agent is a polyethylene glycol ether of hydroabietyl alcohol.

7. Process as in claim 5 wherein said agent is an alkyl aryl polyether alcohol.

8. Process as in claim 1 wherein said agent is an alkyl aryl polyalkoxylated alcohol having a pH of 9.2.

9. Process as in claim 1 wherein said agent is polyethylene glycol ether of hydroabietyl alcohol.

* * * * *